(12) United States Patent
Birkhold et al.

(10) Patent No.: US 8,777,806 B2
(45) Date of Patent: Jul. 15, 2014

(54) DRIVETRAIN FOR A PARALLEL HYBRID VEHICLE

(75) Inventors: Joerg-Michael Birkhold, Gerlingen (DE); Nils Sauvlet, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/603,468

(22) Filed: Sep. 5, 2012

(65) Prior Publication Data

US 2013/0072347 A1 Mar. 21, 2013

(30) Foreign Application Priority Data

Sep. 21, 2011 (DE) .......................... 10 2011 053 832

(51) Int. Cl.
*B60W 10/20* (2006.01)

(52) U.S. Cl.
USPC ............................................................ 477/5

(58) Field of Classification Search
USPC ............................................. 192/53.1, 53.32
See application file for complete search history.

(56) References Cited

U.S. PATENT DOCUMENTS

| | | | |
|---|---|---|---|
| 7,185,722 B1 | 3/2007 | Sakamoto et al. | |
| 7,419,041 B2 | 9/2008 | Diemer et al. | |
| 8,290,654 B2 | 10/2012 | Becker et al. | |
| 8,336,690 B2 | 12/2012 | Maruyama | |
| 8,511,410 B2 | 8/2013 | Venturi | |
| 2002/0065168 A1 | 5/2002 | Kima | |
| 2010/0025176 A1* | 2/2010 | Maruyama | 192/53.341 |
| 2011/0195618 A1* | 8/2011 | Arbuckle et al. | 440/3 |
| 2013/0288850 A1 | 10/2013 | Kaltenbach | |

FOREIGN PATENT DOCUMENTS

| | | |
|---|---|---|
| DE | 10349558 | 6/2005 |
| DE | 10 2005 038 925 | 3/2006 |
| DE | 600 21 163 | 4/2006 |
| DE | 10 2007 037 758 | 3/2009 |
| WO | 2005047040 | 5/2005 |
| WO | 2007072539 | 6/2007 |

* cited by examiner

*Primary Examiner* — Erin D Bishop
(74) *Attorney, Agent, or Firm* — Gerald E. Hespos; Michael J. Porco; Matthew T. Hespos

(57) ABSTRACT

A drivetrain (1) for a parallel hybrid vehicle has an internal combustion engine (2), an electric machine (3) and a transmission (4). The engine (2) and the electric machine (3) interact with a common input shaft (5) of the transmission (4). At least one axle of the vehicle can be driven by the internal combustion engine (2) and/or the electric machine (3) via an output shaft (6) of the transmission (4). A clutch (7) is between the internal combustion engine (2) and electric machine (3) and can open to decouple the internal combustion engine (2) from the input shaft (5) of the transmission (4). The clutch (7) has a first element (8) for positive locking connection of the electric machine (3) to the internal combustion engine (2) and a second element (9) for frictional locking connection of the electric machine (3) to the internal combustion engine (2).

14 Claims, 1 Drawing Sheet

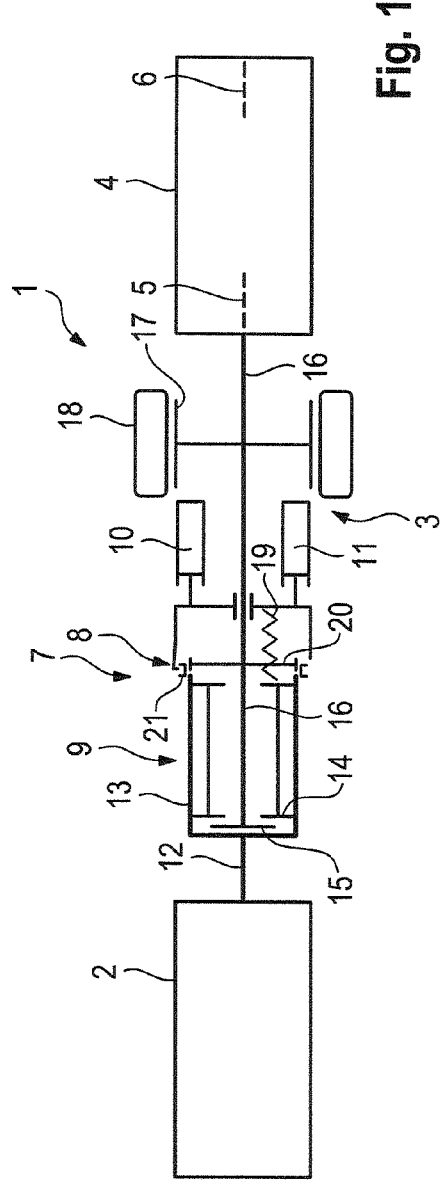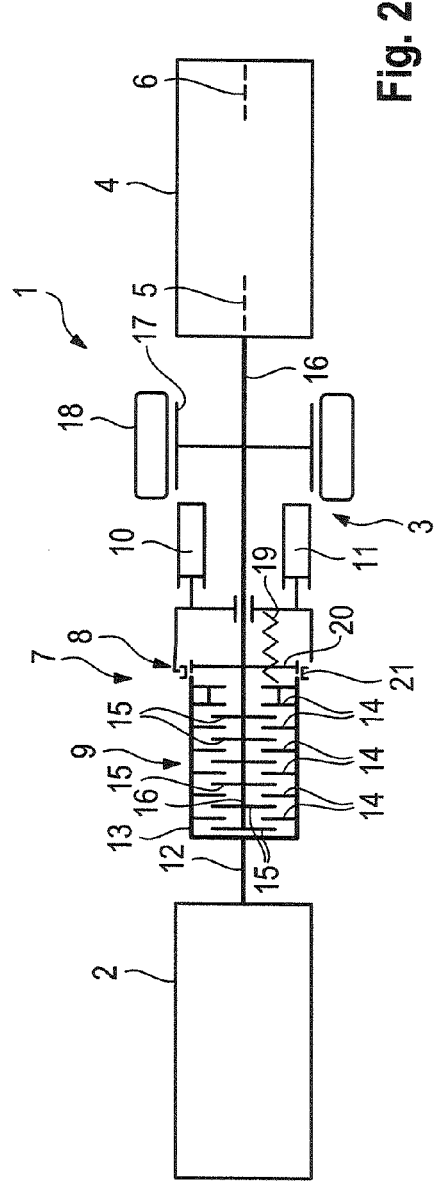

DRIVETRAIN FOR A PARALLEL HYBRID VEHICLE

CROSS REFERENCE TO RELATED APPLICATION

This application claims priority under 35 USC 119 to German Patent Appl. No. 10 2011 053 832.1 filed on Sep. 21, 2011, the entire disclosure of which is incorporated herein by reference.

BACKGROUND OF THE INVENTION

1. Field of the Invention

The invention relates to a drivetrain for a parallel hybrid vehicle, having an internal combustion engine, an electric machine and a transmission.

2. Description of the Related Art

The drivetrain for a parallel hybrid vehicle has an internal combustion engine, an electric machine and a transmission. The internal combustion engine and the electric machine interact with a common input shaft of the transmission. At least one axle of the hybrid vehicle can be driven by the internal combustion engine and/or the electric machine via an output shaft of the transmission. A clutch is between the internal combustion engine and electric machine. The internal combustion engine is decoupled from the input shaft of the transmission when the clutch is open. Thus, the hybrid vehicle is driven by the electric machine alone and the internal combustion engine is stopped. The electric machine spins up the stopped internal combustion engine when the clutch is closed so that the internal combustion engine can be started and can drive the vehicle. The electric machine then either can be shut down or can drive the vehicle together with the internal combustion engine.

The clutch of the above-described parallel hybrid is relatively complex for two reasons. First, the clutch must be very finely controllable so that the electric machine can spin up the stopped internal combustion engine without a jerk occurring in the drivetrain. Second, the clutch must transmit high torques into the drivetrain, in particular in the case of large internal combustion engines. Furthermore, the open clutch must permit high rotational speed differences between its stationary side and its rotating side, so that the electric machine can spin up while the internal combustion engine is stopped.

DE 600 21 163 T2 describes a clutch between a drive input shaft and a drive output shaft of a transmission of a hybrid vehicle for adjusting a transmission torque between the two shafts.

DE 10 2005 038 925 A1 discloses a jaw clutch for an electrically variable transmission for realizing a reverse gear.

DE 10 2007 037 758 A1 proposes a drivetrain for a parallel hybrid vehicle which has only one positively locking clutch.

U.S. 2002/0065168 A1 describes a hybrid vehicle whose transmission has jaw clutches in order to minimize torque fluctuation during gear-changes.

It is an object of the present invention to further develop a drivetrain of the type mentioned in the introduction in such a way that it firstly permits a jerk-free spin-up of the stopped internal combustion engine by means of the electric machine and secondly permits a transmission of high torques of the internal combustion engine into the input shaft of the drivetrain.

SUMMARY OF THE INVENTION

The invention relates to a drivetrain of the type mentioned above where the clutch has a first element for a positively locking connection of the electric machine to the internal combustion engine and a second element for a frictionally locking connection of the electric machine to the internal combustion engine.

It is thus provided that two separate elements can be used as a clutch, instead of a single controllable/regulable (friction) clutch. The first element is a positively locking element, for example a jaw clutch, a Hirth toothing or a synchronizing unit, for positive locking connection of the electric machine to the internal combustion engine. The second element is a controllable/regulable friction clutch for low torques is combined with said first element. The two elements may be actuable by a common actuating element or separate actuating elements. A common actuating element results in both elements being closed when the clutch is closed to realize both the frictionally locking and the positively locking connection. Separate actuating elements enables the generation of the frictionally locking connection and then of the positive locking connection of the electric machine and internal combustion engine. The frictionally locking connection can be eliminated again through actuation of the second element. Thus, it is then not necessary for actuation forces to be introduced continuously into the second element via the actuating element assigned to the second element.

The drivetrain of the invention permits a trouble-free cold start and a trouble-free restart of the internal combustion engine. Here, the positive locking between the internal combustion engine and electric machine is produced only when the friction clutch is closed securely. No torque is transmitted between the internal combustion engine and electric machine when the positive locking element is open and the friction clutch is open. Thus, the electric machine can spin up while the internal combustion engine is stopped.

The second element can be a controllable or regulable friction clutch for low torques. Thus, the second element may be designed only for the restart torque of the internal combustion engine.

The second element preferably is of modular design corresponding to the restart torques of different internal combustion engines that can be used in the drivetrain. For example, a multi-plate friction clutch with a small number of plates may be sufficient for an internal combustion engine with relatively low torque, such as a 4-cylinder engine. On the other hand, a multi-plate friction clutch with a significantly larger number of plates may be necessary to permit restart in the case of an internal combustion engine with higher torque, for example a 6-cylinder engine, a turbocharged 6-cylinder engine, an 8-cylinder engine, a turbocharged 8-cylinder engine, or an internal combustion engine having an even greater number of cylinders.

Scalable restart elements may be used for a hybrid modular construction kit. The friction clutch can be scaled by the number of disks or plate pairs. The clutch preferably is a dry separating clutch.

Larger internal combustion engines require an increased restart torque. As a result of the increasing restart torque, the required wear volume also increases. These circumstances also are allowed for by the insertion of additional disks.

The clutch is scaled in an application-specific manner and thus the invention is not disadvantageous for small applications.

The forces for the actuating system or release system do not increase during the scaling of the coupling. Thus one actuating system may be used for all applications.

The clutch may be activated hydraulically or electromechanically.

The invention will be explained in more detail below on the basis of two exemplary embodiments illustrated in the drawing, without being restricted to these.

BRIEF DESCRIPTION OF THE DRAWINGS

FIG. 1 is a schematic illustration of a first embodiment of the drivetrain for a parallel hybrid vehicle with a friction clutch for transmitting relatively low torques.

FIG. 2 is a schematic illustration of a second embodiment of the drivetrain with a friction clutch for transmitting relatively high torques.

DETAILED DESCRIPTION OF THE PREFERRED EMBODIMENTS

FIG. 1 shows a drivetrain 1 for a parallel hybrid vehicle with an internal combustion engine 2, an electric machine 3 and a transmission 4. The internal combustion engine 2 and the electric machine 3 interact with a common input shaft 5 of the transmission 4. At least one illustrated axle of the hybrid vehicle can be driven by the internal combustion engine 2 and/or the electric machine 3 via an output shaft 6 of the transmission 4. The hybrid vehicle, for example, is a passenger motor vehicle.

The drivetrain 1 also has a clutch 7 between the internal combustion engine 2 and electric machine 3. The internal combustion engine 2 is decoupled from the input shaft 5 of the transmission 4 when the clutch between the internal combustion engine 2 and electric machine 3 is open.

The clutch 7 has a first element 8 for positive locking connection of the electric machine 3 to the internal combustion engine 2 and a second element 9 for frictional locking connection of the electric machine 3 to the internal combustion engine 2. The first element 8 can be actuated by a first actuating element 10, and the second element 9 can be actuated by a second actuating element 11. The actuating elements are either hydraulic or electromechanical.

The second element 9 is a controllable or regulable friction clutch for low torques, and in particular is designed for a torque so that the internal combustion engine 2 can be restarted reliably by the drive of the electric machine 3. The friction clutch has a clutch cage 13 that is connected in a rotationally conjoint manner to an output shaft 12 of the internal combustion engine 2. Additionally, the friction clutch has an outer plate 14, and an inner plate 15 that can be placed in operative connection with the outer plate 14 of the friction clutch. The inner plate 15 is connected in a rotationally conjoint manner to the shaft 16 of the electric machine 3. The shaft 16 is connected in a rotationally conjoint manner to the input shaft 5 of the transmission 4 and furthermore holds the rotor 17 of the electric machine 3 in a rotationally conjoint manner. The stator of the electric machine 3 is denoted by the reference numeral 18. Spring means 19 are provided for imparting an actuating force to the friction clutch.

The end of the clutch cage 13 that faces toward the electric machine 3 has external toothing (not shown), and a disk 20 is connected in a rotationally conjoint manner to the shaft 16 in the region of that end of the clutch cage 13 that faces toward the external toothing. The disk also has an external toothing (not shown). A sliding sleeve 21 with an internal toothing interacts with the external toothing of the disk 20 when the first element 8 is disengaged.

The sliding sleeve 21 is displaced in the direction of the clutch cage 13 when the actuating element 10 is energized so that the sliding sleeve 21 engages both the external toothing of the disk 20 and the external toothing of the clutch cage 13.

The positive locking connection forms a torque-transmitting connection between the output shaft 12 of the internal combustion engine 2 and the shaft 16 of the electric machine 3.

The friction clutch is closed when the other actuating element 11 is actuated so that a torque-transmitting connection from the output shaft 12 of the internal combustion engine 2 to the shaft 16 of the electric machine 3 is produced by the plates 14 and 15.

There is no transmission of torque between the electric machine 3 and the internal combustion engine 2 when the first and second elements 8 and 9 are open so that the hybrid vehicle is driven purely electrically when the electric machine 3 is operated. The second element 9, which is associated with the friction clutch, is closed by actuation of the actuating element 11 if the internal combustion engine 2 is started as a cold start or a restart. The other actuating element 10 is actuated only when the friction clutch is closed securely and thus the shafts 12 and 16 are rotating at the same rotational speed. The sliding sleeve 21 then is displaced and the positively locking connection is effected by engagement of the sliding sleeve 21 into the external teeth of the clutch cage 13 and disk 20. The actuating element 11 then could be activated again so that the friction clutch is opened and only the positive locking connection via the element 8, that is to say the positively locking clutch, is maintained. To open the clutch 7, the friction clutch is closed again, then the positive locking clutch is opened, and then the friction clutch is opened.

One actuating element could be provided instead of the two actuating elements 10 and 11. Thus, the friction clutch first is closed by activation of the one actuating element, and the positive locking is generated only when the friction clutch is closed securely, by means of a follow-up movement, by closure of the positive locking clutch, such as by displacement of the sliding sleeve 21. The opening of the clutch 7 takes place in a reverse sequence, so that upon actuation of the one actuating element, the positive locking clutch first is moved to an open position, and only then is the friction clutch opened.

In the embodiment of FIG. 1, the internal combustion engine 2 is for example a 4-cylinder in-line engine, and therefore is an engine that requires only a relatively low torque to be started electromotively. It is accordingly adequate for a clutch 7 to be provided in which the second element is formed by one plate pair.

The embodiment of FIG. 2 differs from FIG. 1 merely in that the internal combustion engine 2 is a significantly more powerful engine, for example a turbocharged V8 engine, and accordingly, for the transmission of the torque for starting the internal combustion engine 2, a friction clutch is required which has a significantly greater number of plate pairs. In this respect, a multiplicity of outer plates 14 is connected to the clutch cage 13 and a corresponding number of inner plates 15 are connected to the shaft 16.

A greater or smaller number of plate pairs can be used in the friction clutch depending on the torque required for starting the internal combustion engine 2.

An assured transmission of the torque of the internal combustion engine in a driving situation is realized via the sliding sleeve 21. In the event of a cold start, the sliding sleeve 21 transmits torque from the electric machine to the internal combustion engine. The sliding sleeve 21 may be designed for the largest engine of the construction kit. Since the sliding sleeve is a relatively small and lightweight component, it is not disadvantageous for smaller engines. It is thus possible to realize an activation for the clutch and a sliding sleeve for all applications.

What is claimed is:

1. A drivetrain for a parallel hybrid vehicle, comprising:
an internal combustion engine having an output shaft,
an electric machine having a shaft,
a transmission having an input shaft connected in a rotationally conjoint manner to the shaft of the electric machine and the transmission having an output shaft for driving at least one axle of the hybrid vehicle, and
a clutch between the internal combustion engine and electric machine, the clutch having a first element that is closable for achieving a positive locking connection of the electric machine to the internal combustion engine so that both the electric machine and the internal combustion engine drive the input shaft of the transmission, and the clutch having a second element that is closable for achieving a frictional locking connection of the electric machine to the internal combustion engine with a sufficient torque transmission to enable the electric machine to start the internal combustion engine, and the first and second elements being openable to decouple the internal combustion engine from the input shaft of the transmission.

2. The drivetrain of claim 1, wherein the first element is a positive locking element in the form of toothing.

3. The drivetrain of claim 1, wherein the second element is a controllable friction clutch for low torques.

4. The drivetrain of claim 1, wherein the second element is operative only for a restart torque of the internal combustion engine.

5. The drivetrain of claim 4, wherein the internal combustion engine is a first internal combustion engine, and the restart torque is a first restart torque corresponding to the first internal combustion engine, and wherein the second element is of modular design and can be reconfigured for generating at least a second restart torque that is different from the first restart torque, and wherein the second restart torque corresponds to at least a second internal combustion engine.

6. The drivetrain of claim 1, wherein the first and second elements can be actuated by separate actuating elements.

7. The drivetrain of claim 6, wherein the clutch is activated so that, during the closing of the clutch, the positive locking connection by the first element is produced only when the second element is securely closed.

8. The drivetrain of claim 7, wherein the second element is opened after the positive locking connection of the first element has been produced.

9. The drivetrain of claim 6, wherein the separate actuating elements are hydraulic or electromechanical.

10. The drivetrain of claim 1, wherein the first and second elements can be actuated by a common actuating element.

11. The drivetrain of claim 10, wherein the actuating element is hydraulic or electromechanical.

12. The drivetrain of claim 1, wherein the clutch includes a clutch cage connected in a rotationally conjoint manner to the output shaft of the internal combustion engine, at least one plate connected to the clutch cage, at least one plate fixed to the shaft of the electric machine, and the plate fixed to the shaft of the electric machine being frictionally engageable with the plate of the clutch cage.

13. The drivetrain of claim 12, wherein the at least one plate connected to the clutch cage includes a plurality of plates, and the at least one plate fixed to the shaft of the electric machine comprises a plurality of plates that are frictionally engageable respectively with the plates of the clutch cage.

14. The drivetrain of claim 12, wherein the first element includes a disk connected in a rotationally conjoint manner to the shaft of the electric machine and a sleeve for selectively achieving the positive locking connection between the disk and the clutch cage.

* * * * *